April 3, 1928.
N. J. BOOR
CATTLE YOKE
Filed June 14, 1927
1,664,394
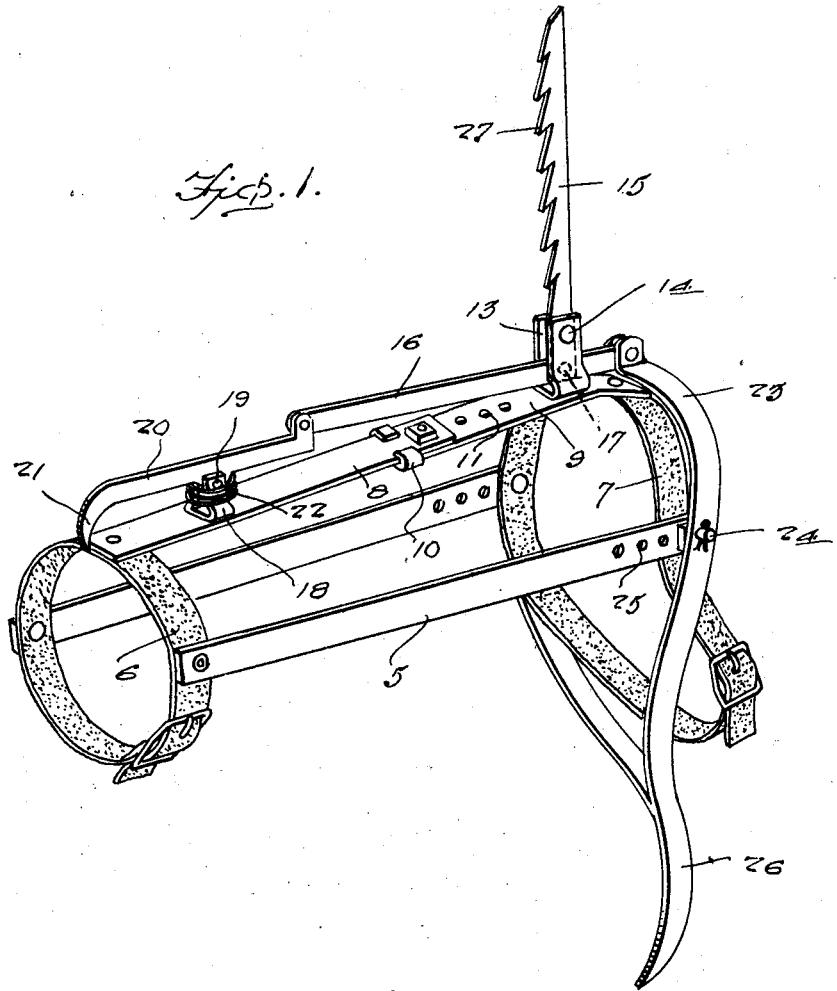
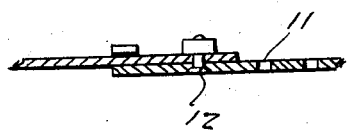
Inventor
Nicholas J. Boor
By Clarence A. O'Brien
Attorney Patented Apr. 3, 1928.

1,664,394

UNITED STATES PATENT OFFICE.

NICHOLAS J. BOOR, OF CLAFLIN, KANSAS.

CATTLE YOKE.

Application filed June 14, 1927. Serial No. 198,752.

My invention relates to yokes for cattle of a type adapted to fit upon the head of the animal and provided with upper and lower vertically extending rods in the form of levers adapted to engage the strands of a wire fence whereby to prevent the head of the animal from being extended through the fence and having means operable by said levers whereby to engage a hook with the nose of the animal as a means for inducing the animal to withdraw its head from the fence.

Another object of the invention is to provide yieldably means connected with the hook for normally maintaining the same out of contacting position with the nose of the animal.

Another object is to provide a halter-like structure adapted to be arranged upon the head of an animal and arranged for adjustment to fit animals of various sizes.

Other objects and advantages reside in the special construction, combination and arrangement of the various elements forming the invention as more fully hereinafter described and claimed, reference being had to the accompanying drawings forming part hereof, wherein:—

Figure 1 is a perspective view of the device, and,

Figure 2 is a longitudinal sectional view through one of the slidably connected adjustable rods.

Referring now to the drawing I have disclosed a preferred embodiment of my invention comprising a cattle yoke formed from a plurality of longitudinally arranged rods 5 formed of any suitable rigid material and having their front edges connected by a nose strap 6 and the rear edges thereof connected by a neck strap 7.

One of said rods is of a sectional formation and arranged to extend between the upper portions of the nose strap and neck strap, one end of said rod indicated at 8 being attached to the nose strap and extending in overlapping relation with a rear section 9 attached to the neck strap. The overlapping ends of the sections 8 and 9 are slidably retained by a guide 10 and said rear section 9 is provided with a series of openings 11 through which a bolt 12 carried by the rear end of the front section 8 may be removably inserted whereby to secure the parts in adjusted position.

A U-shaped bracket 13 is arranged upon the upper face of the rear section 9 through which a pivot pin 14 is transversely arranged and pivotally supporting a vertically extending lever 15. At the lower end of the lever 15 is pivotally connected a horizontal link 16 by a pin 17, said link extending longitudinally with respect to the device and spaced above the sections 8 and 9 connecting the nose and neck straps. Upon the upper face of the front section 8 is arranged a U-shaped bracket 18 having a pivot pin 19 extending transversely therethrough and upon which is pivotally mounted a rod 20 having its rear end connected with the forward end of the link 16 and the forward ends thereof formed into a hook 21 adapted to be moved into and out of engagement with the nose of the animal.

A coil spring 22 is arranged upon the bracket 18 adapted to normally maintain the hook 21 out of engagement with the nose of the animal. At the rear end of the link 16 are attached the upper ends of a pair of arcuate arms 23, said arms being pivotally connected on pins 24 intermediate their ends, said pins being adjustably carried in openings 25 arranged at the rear end of the longitudinally extending rods 5. The lower ends of the arms converge into an integrally formed downwardly extending lever 26 arranged below the head of the animal.

It is thus apparent that should the animal insert its head through the fence having horizontally arranged sections, that the upper lever 15 and lower lever 26 will engage one or more sections of the fence so as to be moved in a rearward direction. By reason of the connection of said levers with the link 16 and the rod 20 carrying the hook 21 the latter will be moved downwardly whereby to engage the nose of the animal. The hook may be sharpened so as to prick the animal which naturally would cause the same to move its head away from the fence.

The forward edge of the upper lever 25 may be formed into a toothed edge indicated at 27 to insure a positive engagement of the lever with one of the sections of the fence.

It is obvious that the invention is susceptible to various changes and modifications without departing from the spirit thereof or the scope of the appended claims and I accordingly claim all such forms of the device to which I am entitled.

I claim:

1. In a device of the class described, a plurality of longitudinally extending rods adapted to be secured upon the head of an animal, levers pivotally mounted thereon and extending substantially at right angles to said rods and a hook movable into or out of engagement with a portion of the animal operatively connected with said levers.

2. In a device of the class described, a plurality of longitudinally extending rods, means carried at each end thereof whereby to secure the same upon the head of an animal, a pair of levers pivotally mounted at the rear of said rods and extending vertically with respect thereto in opposite directions, an animal engaging hook arranged at the forward ends of the rods, means yieldably retaining said hook out of engaged position and means connecting the hook with each of said levers adapted to move the same into engaged position.

3. In an animal yoke, a pair of longitudinally extending side rods, a nose strap attached at the forward ends thereof, a neck strap attached at the rear end thereof, a sectional rod arranged at the upper portion of said strap, means connecting the sections of said rod for longitudinal adjustment, brackets arranged at the opposite ends of said sectional rod, a vertically extending lever pivotally mounted on said rear bracket, a nose engaging hook pivotally mounted on said front bracket, a spring engaging the hook adapted to normally retain the same out of nose engaging position, a link connecting said hook for operation by the lever and a downwardly extending lever pivotally mounted intermediate its ends to said side rods and operatively connected at its upper end with said link for operation thereof simultaneously with said upper lever.

In testimony whereof I affix my signature.

NICHOLAS J. BOOR.